No. 637,382. Patented Nov. 21, 1899.
C. H. GILES.
CROP THINNER.
(Application filed June 10, 1899.)
(No Model.)
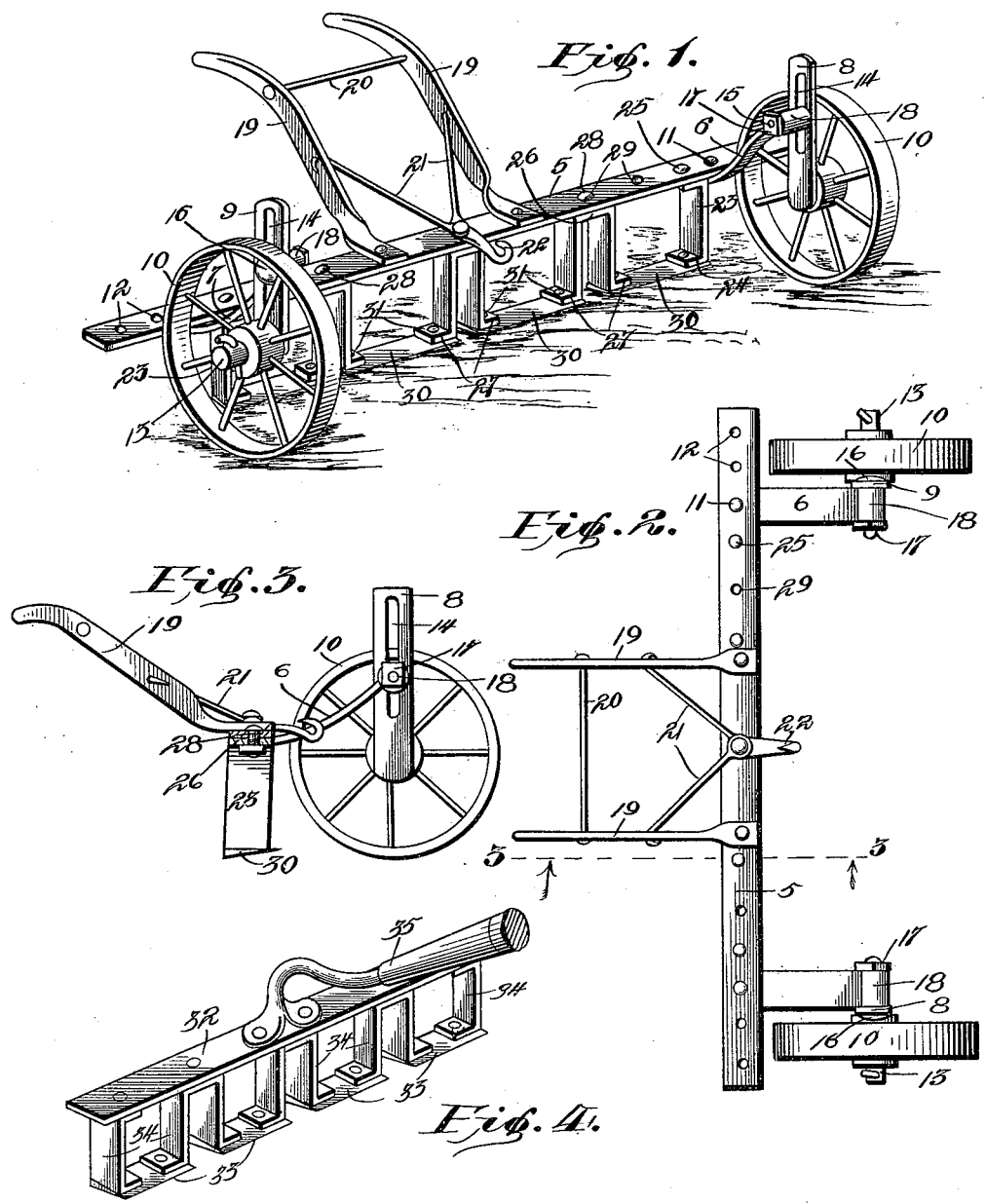
Witnesses
Clarence M. Walker
H. F. Bernhard
Charles H. Giles Inventor
By his Attorneys.
C. A. Snow & Co.
THE NORRIS PETERS CO., PHOTO-LITHO., WASHINGTON, D. C.

UNITED STATES PATENT OFFICE.

CHARLES H. GILES, OF WOLVERINE, MICHIGAN.

CROP-THINNER.

SPECIFICATION forming part of Letters Patent No. 637,382, dated November 21, 1899.

Application filed June 10, 1899. Serial No. 720,046. (No model.)

*To all whom it may concern:*

Be it known that I, CHARLES H. GILES, a citizen of the United States, residing at Wolverine, in the county of Cheboygan and State of Michigan, have invented a new and useful Crop-Thinner, of which the following is a specification.

My invention relates to devices for thinning agricultural crops; and the object is to provide a simple structure especially adapted for cutting growing plants, such as vegetables or sugar-beets, out of the rows; also, to provide for the adjustment of the cutters relatively one to the other, so as to vary the space between the cutters, and, finally, to provide for adjustment of the carrying-wheels in a manner to enable the number of cutter-blades to be varied.

With these ends in view the invention consists in the novel construction and arrangement of parts, which will be hereinafter fully described and claimed.

In the drawings, Figure 1 is a perspective view of a crop-thinner embodying my invention. Fig. 2 is a plan view thereof. Fig. 3 is a cross-sectional elevation on the plane indicated by the dotted line 3 3 of Fig. 2. Fig. 4 is a perspective view of a hand implement embodying the generic features of my invention.

The same numerals of reference are used to indicate like and corresponding parts in each of the several figures of the drawings.

In the embodiment of the invention represented by Figs. 1 to 3, inclusive, the crop-thinning structure is adapted to be drawn by horse-power across the field crosswise of the rows of growing plants. This structure embraces as one element thereof a horizontal carrying-beam 5, and to this beam, at or near the ends thereof, are secured the forwardly-projecting arms 6 7. In the preferred construction of the machine the arms 6 7 thereof are secured adjustably to the carrying-beam for the purpose of moving them inwardly toward each other or laterally away from each other, according to the number of cutters which are attached to the carrying-beam, as will hereinafter appear. Wheel-hangers 8 9 are arranged in vertical positions in front of the carrying-beam 5 and in overlapping relation to the arms 6 7, and these hangers support the carrying-wheels 10, which are arranged in advance of the beam 5, so as to support the cutter appliances of the machine in rear of the wheels. Each arm 6 or 7 is fastened securely to the carrying-beam 5 by means of a bolt 11, which may pass through either of a series of apertures 12, provided near each end of the beam, and the arm may thus be adjusted on the beam by fitting its bolt 11 in one or the other of the apertures 12. Each wheel-hanger 8 or 9 is provided at its lower end with a stub-axle 13, on which is loosely fitted one carrying-wheel 10, and the vertical hanger is furthermore provided with a longitudinal slot 14, through which is adapted to pass a bolt 15, which serves to firmly attach the hanger adjustably to one of the arms 6 or 7. It will thus be seen that the arms which extend forwardly of the carrying-beam support the wheel-hangers, which in turn have the carrying-wheels mounted thereon, and thus the carrying-beam is mounted by the wheels in a position to travel across the field.

The wheel-hangers are fastened adjustably to the arms 6 7 for the purpose of supporting the carrying-beam 5 at different positions, so as to regulate the penetration of the cutter-blades thereon, and in the preferred construction of the machine the arms 6 7 are provided at their forward ends with the clips or eyes 18. The bolt 15 passes through the slot of the hanger and the clip or eye of the arm, and the head 16 of the bolt is adapted to bear against the hanger, while the threaded end of the bolt receives a nut 17, which is screwed up tight against the eye of the arm. It is evident that the nut may be loosened for the purpose of adjusting the relation of the arm to the hanger, and thus the carrying-beam may be raised or lowered with relation to the stub-axles on the hangers.

In addition to the vertical adjustment of the hangers their position may be varied, so as to move the wheels nearer to or farther from the bar, by inclining the standard to one side or the other of the vertical, thereby causing the axle of the wheels to act as fulcra upon which the bar in its vertical adjustment moves as the standard is placed nearer to or farther from the bar. By locating the point of attachment above the axle or pivotal point and locating the pivot considerably in advance of the bar the pull upon the flexible connection will not raise the bar above the ground, and therefore the device may be operated without a tongue.

19 designates the handle-bars, which are firmly secured at their front ends to the carrying-beam 5 by suitable bolts. These handle-bars are united together by a tie-rod 20, and they are braced by the stays 21, which are attached to said bars and to the beam. As shown by Fig. 2, the braces 21 overlap one another and are fastened by a single bolt to the beam, which bolt also serves to attach the draft-hook 22 to said beam. This common fastening of the braces and draft-hook, however, is not material, as said parts may be secured independently to the beam.

The machine is equipped with a plurality of knife-hangers, which are adjustably fastened to said beam, and to provide for the adjustment of the knife-hangers the beam 5 is formed with a series of transverse apertures 29, which are spaced at proper distances one from the other. The knife-hangers at the ends of the series are indicated by the numeral 23, and each hanger is provided with an angular foot 24 and is fastened to the beam by a bolt 25, which passes through one of the apertures 29 and the upper end of the knife-hangers. The intermediate knife-hangers are of doubled or looped construction, as indicated at 26, and each looped knife-hanger has its ends constructed to provide the angular feet 27, arranged in the same horizontal plane as the feet on the single knife-hangers 23 near the ends of the beam. The doubled knife-hangers 26 are fastened to the beam 5 by bolts 28, which pass through certain of the apertures in said beam, and thus each knife-hanger is secured detachably to the beam, so that the hangers may be adjusted on the beam to occupy different positions thereon in order to provide for the use of cutters or blades which may differ in length.

It will be noted that the hangers have an inverted substantially U shape, and the blades 30 have their opposite ends connected to the opposite members of adjacent hangers, thereby forming a continuous bracing connection between the blades and the hangers and extending from end to end of the series of hangers. It is preferable to connect the blades to adjacent hangers, as described, so that the hangers may be adjusted toward or away from one another, in order that blades of different lengths may be employed, which relation of parts obviates the necessity of providing extra hangers for the varying sizes of blades.

Each pair of knife-hangers is designed to support one of the series of cutter-blades 30, and said blades are secured firmly to the feet of the hangers by means of bolts 31. The series of blades are arranged in the same horizontal plane, with proper intervals or spaces between said blades, and in the embodiment of the invention shown by the drawings I have represented four of these blades as attached to a series of three double hangers and two end hangers. It will be understood, however, that the number of double and single hangers which may be employed is not material, because the hangers may be disposed in different relation or order to support a different number of blades, which may vary in width; but it is essential that the blades shall be attached to hangers which serve to space the blades at proper intervals apart in order that the machine may operate to cut out certain of the plants while leaving other plants in the row undisturbed.

A suitable draft appliance is hitched to the draft-hook 22, and the machine is drawn crosswise of the rows. The operator grasps the handle-bars in order to guide the machine as may be required, and when desired the beam and the cutters thereon may be raised clear of the ground, because the beam is attached to the hangers which carry the stub-axles for the carrying-wheels. This elevation of the beam and cutters is especially advantageous when the hangers are liable to become choked or clogged by accumulation of plants or trash on the hangers or the cutters, and thus the machine may be kept in a cleaned condition to secure maximum efficiency in service. The cutters are adapted to ride on the ground in order to cut their way through the rows, and thereby sever the roots of the plants which lie in the path of the blades 30; but as the knives are spaced apart it is evident that certain of the plants may remain undisturbed in the rows, whereby the machine is adapted to accurately thin the rows of growing plants when it is drawn crosswise of the field.

By means of the pivotal connection between the wheel-hangers 8 and the respective arms 6 and 7 said hangers may be tilted or adjusted in a direction front and rear of the device, whereby the pivotal connection afforded by the bolt 15 may be elevated or depressed, which will change the angle of attack of the blades to an upward or downward inclination, so as to accommodate the machine to various conditions and characters of crops.

In the embodiment of the invention represented by Fig. 4 I have shown the series of spaced blades 33 connected by the hangers 34 to a head-bar 32, and to this bar is secured a handle or staff 35. This implement is especially adapted to be used by hand for the purpose of thinning the rows of growing plants; but evidently the horse-power machine represented by Figs. 1 to 3, inclusive, is capable of more efficient and economical operation.

Changes in the form, proportion, size, and the minor details of construction within the scope of the appended claims may be resorted to without departing from the spirit or sacrificing any of the advantages of this invention.

Having thus described the invention, what I claim is—

1. A crop-thinner, comprising a bar, a series of inverted substantially U-shaped hangers pendent from the bar, and cutting-blades secured to the opposite members of adjacent hangers, forming a continuous bracing connection between the blades and hangers, and extending from end to end of the series of hangers, substantially in the manner shown and described.

2. A crop-thinner, comprising a bar having a series of pendent cutters, forwardly-projecting arms located at opposite ends of the bar, wheel-hangers carried by the respective arms, each hanger having a front and rear pivotal or hinged adjustment upon its respective arm, wheels carried by the hangers and located below the adjustable connections thereof, and draft appliances connected to the bar, substantially as and for the purpose set forth.

3. In a crop-thinner, the combination, with a bar, of a series of blades secured thereto in the same horizontal plane, an upwardly-extending arm at each end of the bar, a wheel adjustably secured to each arm, the axle of the wheel being below the upper end of the arm, a draft-hook secured to the bar and lying in a plane intermediate the upper end of the arm and the axle of the wheel, and rearwardly-extending handles secured to the bar.

4. In a crop-thinner, the combination, with a bar, of a series of hangers secured thereto, blades secured to the hangers in the same horizontal plane, an upwardly-extending arm adjustably secured to each end of the bar, the outer end of each of which is provided with an eye, a slotted standard the lower end of which is provided with a stub-axle, a bolt through the eye of the arm and the slot of the standard, a wheel upon the axle, and means for flexibly connecting the draft appliances to the bar for operating the thinner.

In testimony that I claim the foregoing as my own I have hereto affixed my signature in the presence of two witnesses.

CHARLES H. GILES.

Witnesses:
 FRED START,
 ARTHUR C. PRESSLAND.